May 29, 1951 M. VIRATELLE 2,554,605
POWER-PROPELLING UNIT FOR BICYCLES
Filed Dec. 29, 1945 3 Sheets-Sheet 1
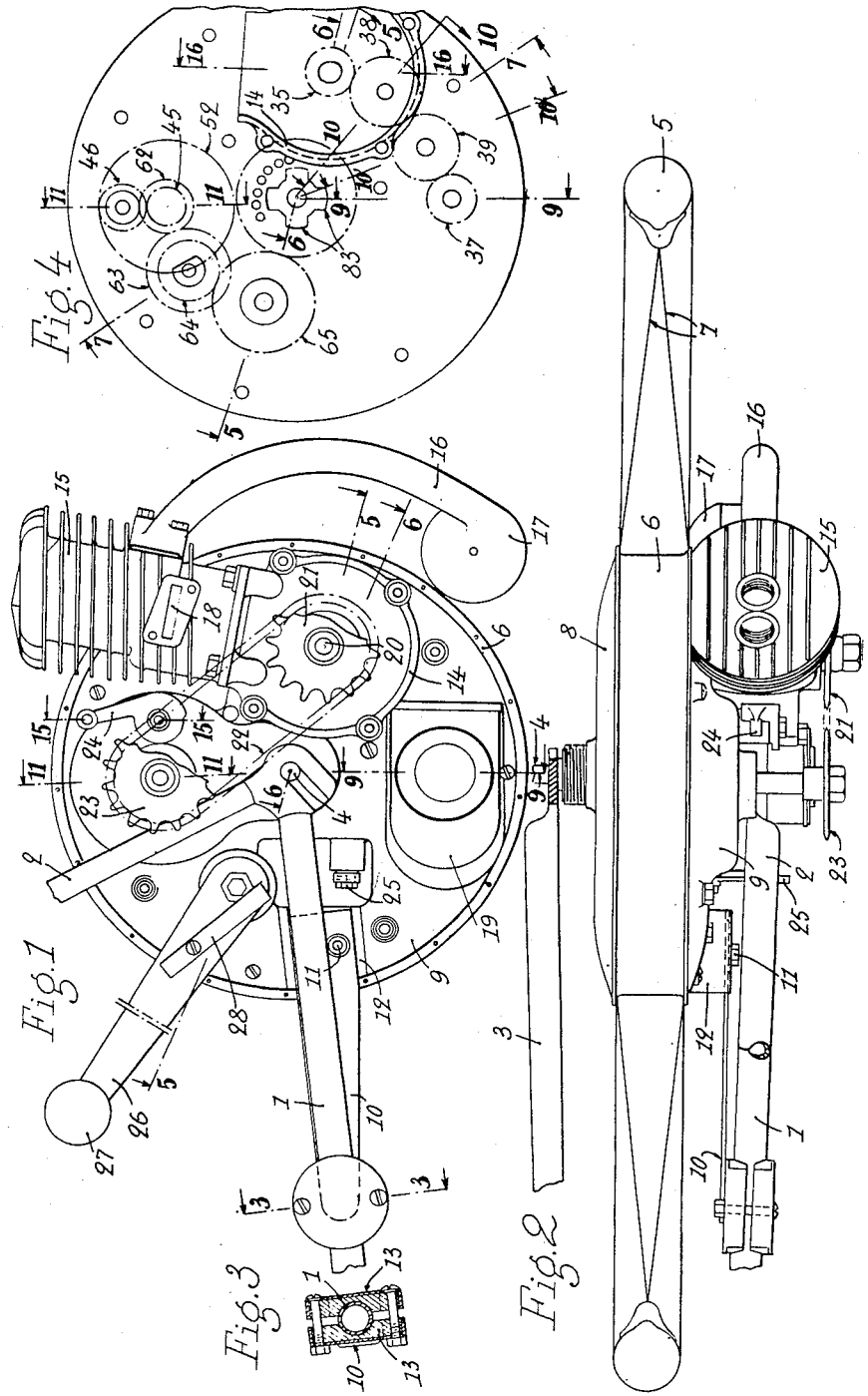
INVENTOR
MARCEL VIRATELLE May 29, 1951　　　　　　　M. VIRATELLE　　　　　　　2,554,605
POWER-PROPELLING UNIT FOR BICYCLES
Filed Dec. 29, 1945　　　　　　　　　　　　　　　3 Sheets-Sheet 2
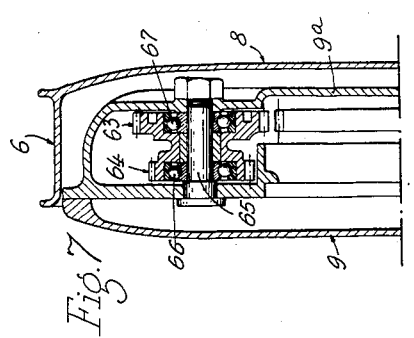
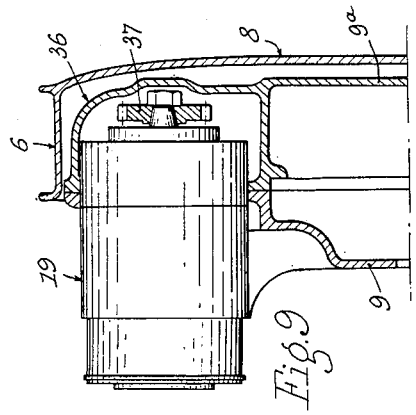
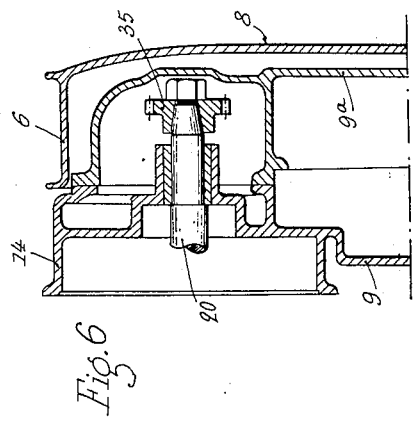
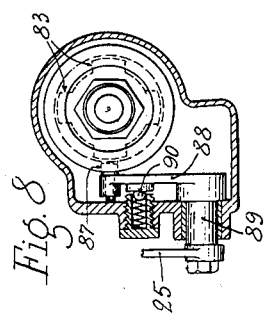
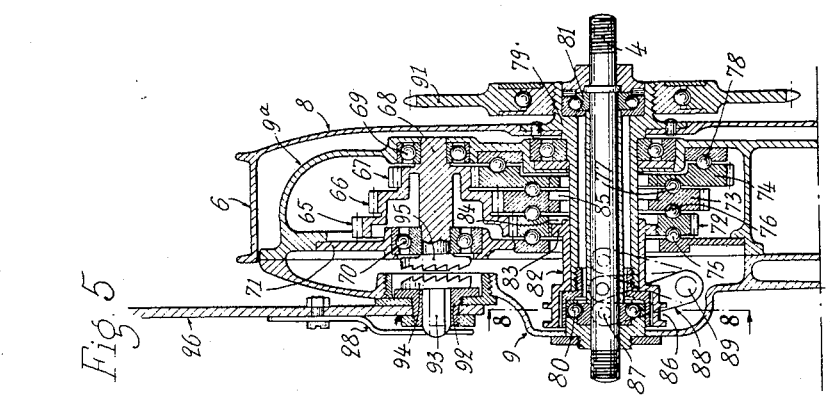
INVENTOR
MARCEL VIRATELLE
HIS ATTY May 29, 1951 M. VIRATELLE 2,554,605
POWER-PROPELLING UNIT FOR BICYCLES
Filed Dec. 29, 1945 3 Sheets-Sheet 3
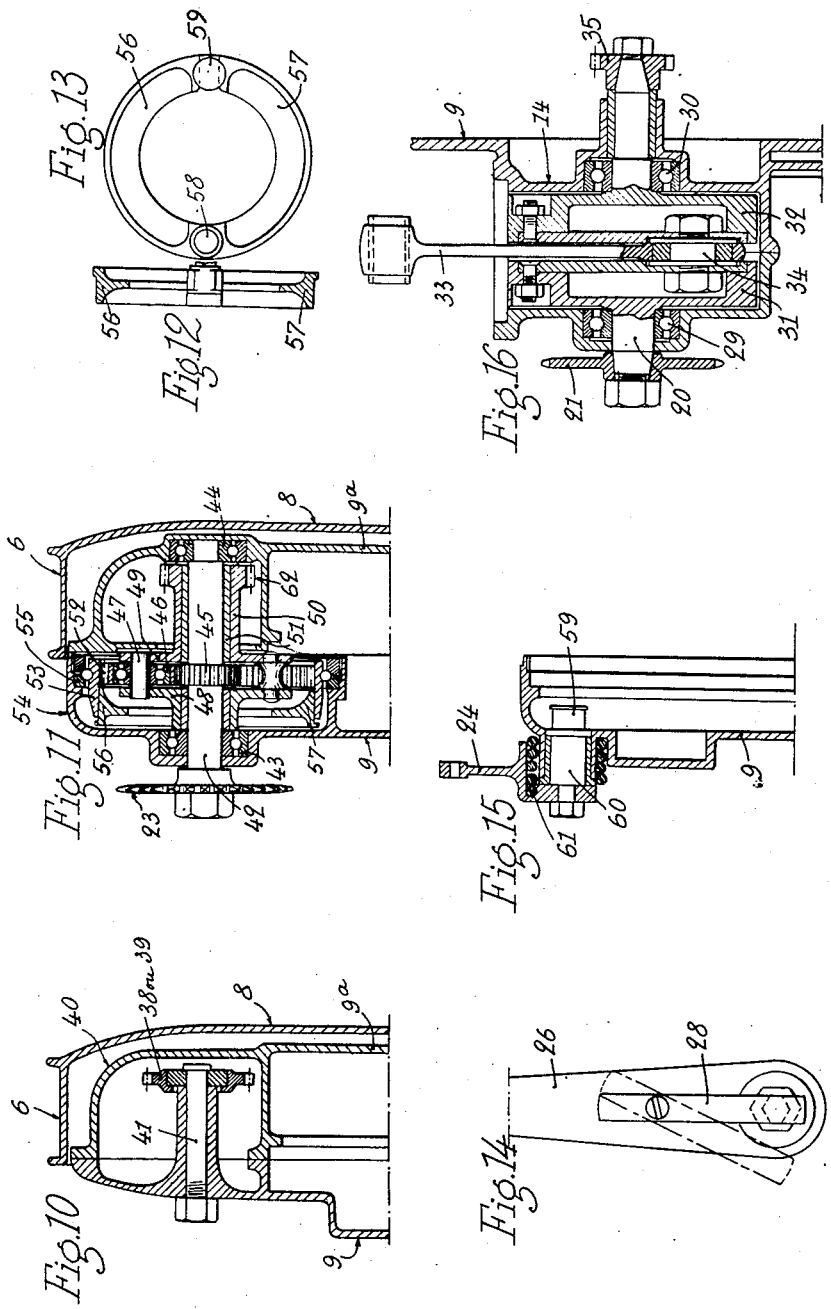
INVENTOR
MARCEL VIRATELLE
HIS ATTY Patented May 29, 1951

2,554,605

UNITED STATES PATENT OFFICE 2,554,605

POWER-PROPELLING UNIT FOR BICYCLES

Marcel Viratelle, Paris, France

Application December 29, 1945, Serial No. 638,079
In France March 10, 1941

Section 1, Public Law 690, August 8, 1946
Patent expires March 10, 1961

1 Claim. (Cl. 180—33)

This invention has for its object to devise a self-contained compact and light power propelling unit, generally applicable to light vehicles of any types, but more particularly to bicycles, tandem cycles, tricycles, quadricycles, etc.

The invention also has for its object to devise an arrangement such that the propelling unit may be housed in such a narrow space that a bicycle wheel equipped with said driving unit forms an integral unit which can be mounted in the fork of a conventional bicycle, preferably the rear fork. Another object is to reduce the weight and secure a distribution of the various masses in such manner that the device may be used on conventional bicycles, no matter how light the frame thereof.

Another object of the invention is to provide a construction which does not interfere with the propulsion of the vehicle by the pedals, by shifting the speed gears to dead center, whereby the wheel will only drive the hub, the inertia of the rotating parts not being substantially in excess over that of a conventional bicycle wheel, and the smooth pedalling qualities of the bicycle being preserved, a bicycle fitted with such a driving wheel differing from a bicycle provided with an ordinary wheel only by the additional weight of the driving unit.

A further object of the invention is to arrange the speed change gear coaxially with the wheel and to provide a strong and compact structure.

A still further object of the invention is to provide an integral driving wheel which can be easily and economically adapted on a bicycle and will be interchangeable with a conventional wheel.

With these objects in view the propelling unit according to the invention essentially comprises a fixed circular housing accommodating a rotary hub structure which is in rigid relationship with the driving wheel of the vehicle and wherein are housed most of the mechanical parts required for the operation, the speed-change gear comprising a set of loose pinions coaxial with the hub and each of which may be selectively and directly caused to rotate with the hub by means of a slidable key.

The engine may be integral with or secured to the circular housing and the hub may be rigidly connected to a flange carrying the rim of the wheel or with a drum connected to said rim by spokes, said drum preferably surrounding the fixed housing with a small clearance.

Further features and advantages of the invention will made clear from the following description; with reference to the appending drawing, which shows, by way of example, an embodiment of the invention and wherein:

Fig. 1 is a side elevational view of the driving unit.

Fig. 2 is a corresponding plan view.

Fig. 3 is a section on line 3—3 of Fig. 1, showing the attachment of the anchoring link on the rear fork of the bicycle.

Fig. 4 diagrammatically shows the transmission between the engine on one hand and the driving wheel and the parts associated with the engine on the other hand.

Figs. 5 to 7 are sections on lines 5—5, 6—6 and 7—7 of Fig. 1 or Fig. 4.

Fig. 8 is a section on line 8—8 of Fig. 5.

Figs. 9 to 11 are sections on lines 9—9, 10—10 or 10'—10' and 11—11 of Fig. 1 or Fig. 4.

Fig. 12 is a section through the braking members of the clutch.

Fig. 13 is a side elevation thereof.

Fig. 14 is a side-view of a part of the engine-starting lever.

Fig. 15 is a section through line 15—15 of Fig. 1.

Fig 16 is a section through line 16—16 of Fig. 4.

As shown in Figs. 1 and 2, reference numerals 1 and 2 denote the tubular bars forming one side of the rear fork of a bicycle and 3 the lower tubular bar at the opposite side. Numeral 4 denotes the axle of the rear wheel 5.

The usual hub of the wheel is replaced by a drum 6, of relatively large diameter, rotatably mounted on axle 4 and connected to the rim of the wheel 5 through spokes 7.

Drum 6 is formed at one side with a rotary flange 8 and is open at the opposite side, where it surrounds in close relationship a fixed disc 9, adapted to support the elements of the driving unit, said disc 9 being held stationary by means of an anchoring link secured at one end to a boss 12 of disc 9 by means of bolts 11 and at the other end either to the pedal supporting structure or to the rear fork, for instance by means of a collar 13 formed in two parts, one of which is welded to said link.

Disc 9 preferably consists of a casting, serving as a housing protector or carrier for the engine and associated parts. The crankcase of the engine, shown at 14, projects laterally from disc 9 and has secured thereto the engine cylinder 15; the exhaust pipe 16 of the engine is provided with a sound damping exhaust device 17.

The engine is preferably of the two-stroke type and the intake port 18 thereof is connected by a pipe (not shown) with the carburetor. The latter, as well as the fuel tank, may be installed at a suitable place on the bicycle as, for instance, on the luggage carrier or within the frame. Ignition of the engine is provided by means of a magneto 19 carried by disc 9.

At the end of the crankshaft 20 is mounted a sprocket 21, which through a chain 22, drives a sprocket 23 adapted to rotate the bicycle wheel through a clutch, a speed-reducing gear and a speed-change gear, which will be hereinafter described. The clutch control lever is shown at 24 and the speed-change lever at 25. The starting device, described below, is actuated by a lever 26, provided with an operating handle 27 and an oscillating spring plate 28, the purpose of which is described below.

Fig. 16 shows in detail the connecting rod mounting. The crankshaft 20 supported in bearings 29, 30 of the crankcase 14, is built up of two aligned trunnions, respectively integral with flanges 31, 32 of such mass as to constitute a fly wheel substantially filling the crankcase 14, so as to reduce the overall dimensions and the weight to a minimum, whereas the connecting rod 33 is held between said flanges and is pivoted at its end to a crankpin 34. At one end, shaft 20 carries the above-mentioned sprocket 21 and at the opposite end, a pinion 35 (Figs. 6 and 16) for controlling the ignition magneto 19. Magneto 19 is housed in a recess 36 of a cup 9a bolted to the disc 9 (Fig. 9) and its shaft carries a pinion 37 operatively connected with pinion 35 through two intermediate meshing pinions 38—39 (Fig. 4). Said intermediate pinions (Fig. 10) are identically mounted (this is why Fig. 10 corresponds to both sections 10—10 and 10'—10' of Fig. 4) in recesses 40 of the cup 9a, on stub-shafts 41.

Sprocket-wheel 23 (Figs. 1 and 11) which is driven by the engine as above explained is keyed to a shaft 42, supported in bearing 43—44 of the disc 9 and cup 9a respectively. On said shaft is cut a pinion 45, constituting the inner sun-gear of an epicyclic gearing and meshing with a planetary pinion 46, keyed to a shaft 47, connecting the side walls 48, 49 of the planetary supporting structure 50, coaxial mounted on shaft 42 with the interposition of an antifriction bushing 51.

Planetary pinion 46 meshes with an annular sun-gear or annulus 52, in rigid relationship with a brake-drum 53, mounted in a recess of disc 9 by means of a ball-bearing 55. Said brake drum may be held stationary by means of brake-members 56, 57, pivoted about an axis 58 and controlled by a cam 59 (Figs. 12, 13 and 15). Cam 59 is formed at the end of a shaft 60, to which is secured a clutch lever 24, the clutch spring consisting of a helical spring 61.

Normally, spring 61 urges the brake-members against drum 53 and keeps the latter stationary, so that an epicyclic motion is imparted to the planetary supporting structure.

When the brake-drum is released by the cyclist operating the clutch lever 24, annulus 52 is idle and the planetary supporting structure 50 remains stationary.

Movement of the planetary supporting structure is transmitted through a pinion 62, formed thereon to an intermediate pinion 63 (Figs. 4 and 7) rigidly connected with a pinion 64, both being mounted on a shaft 65 by means of ball-bearings 66, 67.

Pinion 64 meshes with a pinion 65' (Figs. 4 and 5) forming part of a set of stepped pinions 65', 66, 67, integral with a shaft 68, supported in bearings 69—70 respectively mounted in disc 9a and in a partition 71 secured thereto.

Pinions 65', 66, 67 are constantly in mesh with loose pinions 72, 73, 74 arranged between partitions 71 and the cup 9a thrust ball bearings 75, 76, 77, 78 being interposed there between and serving to center said pinions with respect to the rear wheel axle 4.

Said axle carries a hub 79 supported in ball bearings 80, 81, and secured to the flange 8 of drum 6. Said hub is positively connected by means of a sliding key, splines or similar means, with a sliding sleeve 82, having projections or splines of star formation 83 (Figs. 4, 5 and 8), adapted to engage corresponding shaped notches provided in the center portion of pinions 72, 73, 74, so as to positively connect any one of said pinions with hub 79. Pinions 72, 73, moreover comprise in the middle portion thereof circular cupped portions 84, 85, adapted to accommodate the projections 83, whereby pinions 72, 73, 74 become idle upon the hub 79.

Sleeve 82 is provided with a groove 86, adapted to be engaged by a stud 87 (Fig. 5), carried by a lever 88, secured to a shaft 89 to which is keyed the speed lever 25, a spring loaded ball 90 (Fig. 8) maintaining the lever 25 in its various operative positions.

It will be seen that, the clutch being engaged (Fig. 11) rotation of the engine is transmitted through parts 21, 22, 23, 45, 46, 63—64, 65' to shaft 68 and, through pinions 65', 66—67 to pinions 72, 73, 74, which are constantly rotated. According to the position of the speed lever 25, one or the other of pinions 72, 73, 74 is positively connected with hub 79 and the vehicle wheel, through the projections 83 of sleeve 82, or alternatively all pinions 72—73—74 are idle (dead center). There are two dead centers, corresponding to both cupped portions 84, 85.

Hub 79 carries a free wheel pinion 91, connected by the usual chain drive to the pedal gear, for allowing the bicycle to be foot propelled if desired.

The engine is started by means of the hand lever 26 secured to a hollow shaft 92 (Fig. 5). Extending through the latter is a shaft 93, the inner end of which carries clutch teeth 94, facing cooperating teeth 95 formed at the end of shaft 68 and the outer end of which projects outwardly to engage a spring blade 28. In the position shown in Fig. 5 and in dotted lines in Fig. 14, spring blade 28 is pivoted away from shaft 93 and the clutch teeth 94—95 are disengaged. To start the engine, the operator turns the spring-blade 28 to the position shown in full lines in Fig. 14, wherein said spring blade urges the projecting end of shaft 93 inwardly, thereby causing teeth 94, 95 to engage, and then depresses pedal 27 (Fig. 1) to rotate shaft 68 and consequently the engine, said motion being amplified by the transmission connecting shaft 68 to the engine crankshaft.

It will be observed that, when the speed lever 25 is at its dead center, the vehicle wheel 5 rotates freely with drum 6 and hub 79, without driving any part of the speed change gear, transmission, clutch or engine, so that the inertia of the rotating vehicle wheel is hardly greater than that of a conventional bicycle wheel.

The use of an outer chain drive 22 between the engine and the clutch provides for ready replacement of the pinions 21, 23 and for the possibility of obtaining different transmission ratios according to the conditions of use of the motor bicycle (town driving, flat land or hilly country etc.).

The invention is of course in no way limited to the details of construction described above, which have been given by way of example only.

I claim:

In a cycle comprising a rear fork the combination of a power driven wheel, an axle rigidly secured to said fork, a circular housing carried by said axle, means connecting said housing to said fork for holding said housing against rotation, an internal combustion engine laterally secured to said housing, a hub rotatably mounted on said axle inside said housing, a wheel concentrically and rigidly secured to said hub, a speed change sleeve slidably mounted on said hub, speed change pinions coaxial to said axle and carried by said housing, projections carried by said sliding sleeve and adapted to successively engage said pinions, said sleeve and said pinions being disposed in the gap of said fork of a conventional bicycle and like vehicles.

MARCEL VIRATELLE.

REFERENCES CITED

The following references are of record in the file of this patent:

UNITED STATES PATENTS

| Number | Name | Date |
|---|---|---|
| 400,150 | Weston | Mar. 26, 1889 |
| 904,721 | Perillard | Nov. 24, 1908 |
| 1,247,752 | Van Antwerp | Nov. 27, 1917 |
| 1,284,970 | Anderson | Nov. 19, 1918 |
| 1,421,545 | Osborn | July 4, 1922 |
| 1,870,761 | Wiasemsky | Aug. 9, 1932 |
| 2,253,408 | Watkins et al. | Aug. 19, 1941 |

FOREIGN PATENTS

| Number | Country | Date |
|---|---|---|
| 558,826 | France | June 2, 1923 |